United States Patent Office 3,379,288
Patented Apr. 23, 1968

3,379,288
VEHICLE ANTI-SKID BRAKING SYSTEMS
John Walter Davis, Coventry, England, assignor to Dunlop Rubber Company Limited, London, and Birmingham, England, a corporation of Great Britain
Filed Aug. 15, 1966, Ser. No. 572,578
Claims priority, application Great Britain, Aug. 24, 1965, 36,194/65, 36,195/65
13 Claims. (Cl. 188—181)

ABSTRACT OF THE DISCLOSURE

This invention comprises an anti-skid having an inertia flywheel with two relatively angularly movable members, one of which is responsive to flywheel over-running to signal wheel skid. The two relatively movable members are held together by a torsion spring which also provides a torque resistance opposing relative rotation of the two members which effects a camming apart to operate a brake applying system in response to skid condition. The coil spring is readily adjustable to control the deceleration rate at which the device is intended to operate.

---

This invention relates to vehicle anti-skid braking systems and particularly to rotary-inertia skid-sensing devices for use in such systems.

One object of the invention is to provide an inexpensive and easily assembled rotary-inertia skid-sensing device.

According to the invention, a rotary-inertia skid-sensing device comprises a flywheel drivable by a shaft through a friction clutch which is arranged in operation of the device to permit the flywheel to overrun the shaft when the rotating shaft is decelerated, and cam means arranged to be operated upon deceleration of the shaft relative to the flywheel to actuate a skid-correcting system, the cam means comprising a pair of axially-aligned relatively rotatable cam members having adjoining end faces on which cam surfaces are formed and including a torsion spring arranged to oppose relative angular movement of the cam members when the flywheel overruns the shaft, the torsion spring also providing an axially directed force to urge the cam members towards one another.

One embodiment of the invention will now be described, by way of example, with reference to the accompanying drawings, in which.

Figure 1:
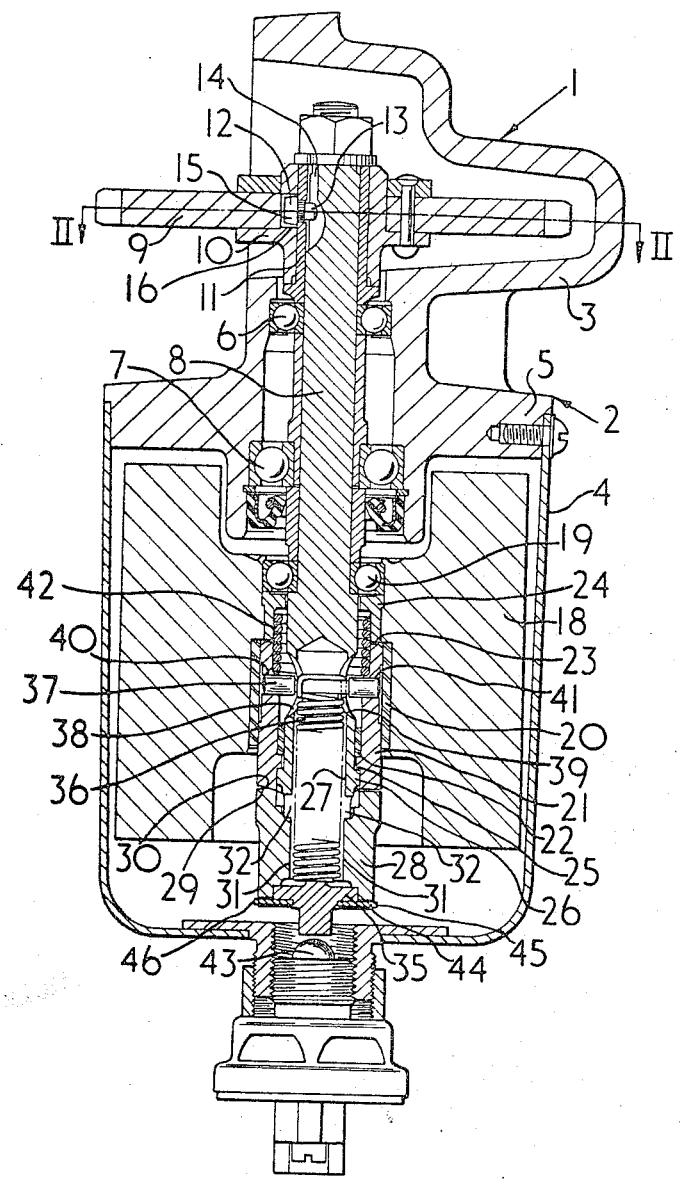
FIGURE 1 is an axial cross-section through a rotary-inertia skid-sensing device in accordance with the invention.

A rotary-inertia skid-sensing device 1 comprises a metal housing 2 formed from two main components, a body portion 3 and a generally cup-shaped cover portion 4. The cover portion is secured coaxially with the body portion on an outwardly directed radial flange 5 formed on the body portion.

Figure 2:
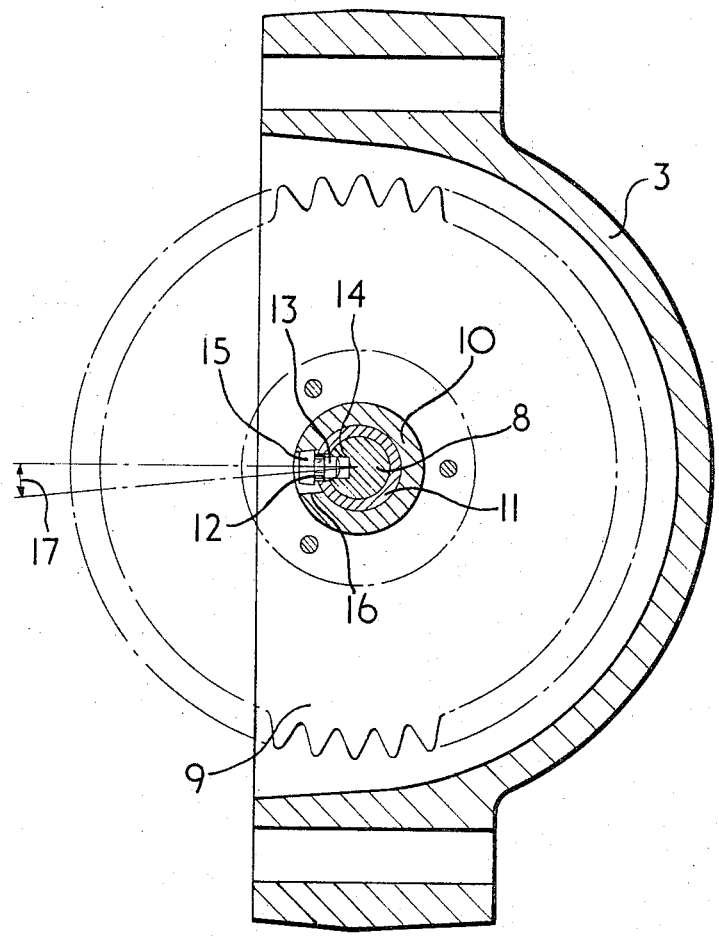
FIGURE 2 is a section on the line II—II of FIGURE 1.
Figure 4:
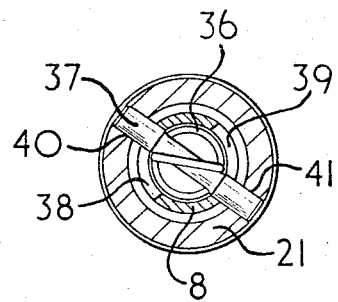
FIGURE 4 is a cross-section on the line IV—IV of FIGURE 3.

The body portion 3 is provided with bearings 6 and 7 to support a rotatable shaft 8 passing coaxially through the body portion and arranged to be driven by means of a drive member in the form of a gear wheel 9 drivably connected to a drive shaft (not shown) for the driven wheels of an associated vehicle. The gear wheel 9 is secured to a flanged bush 10 which is mounted on the shaft 8 so as to be capable of relative rotation through a predetermined angle with respect to the shaft 8. The flanged bush 10 is mounted on a bearing sleeve 11 in which a peg 12 is press-fitted. The peg 12 has a shank portion 13 which engages an axial keyway 14 formed in the shaft 8, and a frusto-conical head portion 15 which engages a slot 16 formed in the bush 10. The slot 16 is of sufficient width, considered in the circumferential direction with respect to the shaft 8, to permit the gear wheel 9 to rotate through an angle 17 (see FIGURE 2) relative to the shaft 8.

The angle 17 constitutes "backlash" in the drive connection between a first rotatable member consisting of the gear wheel 9 and bush 10 and a second rotatable member consisting of the shaft 8 and bearing sleeve 11, and the provision of such "backlash" forms the subject-matter of our copending U.K. patent application No. 36,-194/65. Briefly, the purpose of providing backlash in the drive connection is to enable the rotary-inertia skid-sensing device to be driven from a drive mechanism associated with a vehicle wheel, such as a propellor shaft or gear train, without incurring the risk that the device will be subjected to spurious decelerations which would occur as a result of transmission backlash, for example, whenever the driver of the vehicle changed gear. The backlash represented by the angle 17 is chosen so that it is equal to or slightly greater than the backlash existing in the drive connection between the associated vehicle wheel and the drive mechanism from which the rotary-inertia skid-sensing device is driven.

An annular flywheel 18 is rotatably mounted coaxially with the rotatable shaft 8, the flywheel being supported at one end by a bearing 19 carried on the shaft 8 and at the other end by the outer surface of a low-friction bush 20 fitted around the outer surface of a first hollow cylindrical cam member 21 which is itself rotatably mounted on the shaft 8, a second low-friction bush 22 being provided between the inner surface of the cam member 21 and the shaft.

The first cam member 21 is located against axial movement by its engagement at one end with a shoulder 23 formed by the end of a sleeve 24 drivably fitted to the flywheel, and by the provision of an inwardly projecting annular lip 25 engaging a corresponding lip 26 formed on the shaft 8 to prevent axial movement of the first cam member 21 away from the flywheel.

The shaft 8 is bored from its end within the cover portion 4 to provide a hollow portion 26 coextensive with the first cam member 21 and with a second hollow cylindrical cam member 28 which has an end face 29 adjoining the corresponding end face 30 of the first cam member 21 and extends coaxially around the end of the shaft 8. The second cam member 28 is drivably secured to the shaft 8 by radially inwardly projecting keys 31 formed on the cam member which engage axially extending slots 32 formed in the shaft 8, the second cam member 28 thus being capable of axial displacement on the shaft while being secured against rotation relative to the shaft. The second cam member 28 is formed from a low-friction plastic material.

Figure 3:
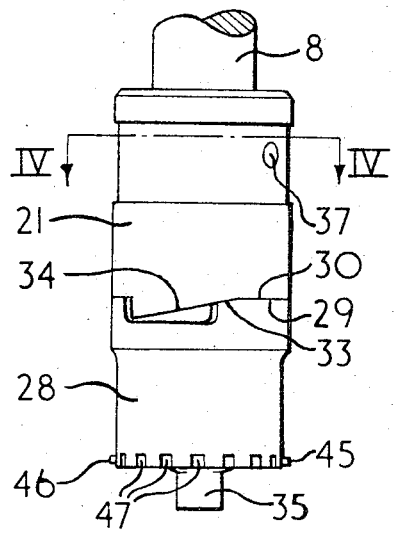
FIGURE 3 is a detail view showing the cam mechanism of the device shown in FIGURES 1 and 2.

The adjoining end faces 29, 30 of the cam members 28, 21 are formed with pairs of complementary cam surfaces 33, 34 (see FIGURE 3), the arrangement being such that rotation of the cam members relative to one another about the axis of the shaft causes the members to be forced axially apart. The second cam member 28 is provided with a fastening member in the form of an end cap 35 which forms an anchoring point for one end of a coiled torsion spring 36 which is located coaxially within the hollow end of the shaft and is fastened at its other end to a transverse peg 37. The spring 36 is secured to the end cap 35 against tension and torsion stresses.

The ends of the transverse peg 37 pass, respectively, through a pair of clearance holes 38, 39 of frusto-conical form bored transversely in the wall of the hollow portion 27 of the shaft 8 at diametrically opposite points, and are push-fitted in diametrically opposite holes 40, 41 formed in the first cam member 21. The transverse peg 37 thus serves to drivably connect the first cam member 21 to the shaft 8 whenever the shaft is turned through an angle exceeding the clearance afforded by the frusto-conical holes 38, 39.

The first cam member 21 is drivably connected to the flywheel 18 by a coiled clutch spring 42 one end of which fits within the inner surface of the cam member 21 and the other end of which fits within a corresponding bore of equal diameter formed in the sleeve 24 which rotates with the flywheel. The clutch spring 42 is wound so that when the shaft 8 is rotated by a vehicle transmission, via the gear wheel 9, in the normal direction for forward movement of the associated vehicle the first cam member 21, driven by the transverse peg 37, applies a torque to the clutch spring 42 which tends to "unwind" the spring 42 and force it to expand radially outwardly to grip the inner surfaces of the cam member 21 and the sleve 24 secured to the flywheel 18. This provides a positive drive coupling which ensures that the flywheel 18 is driven at the same speed of rotation as the shaft 8 so long as the associated road wheels' speed is steady or increasing. Following the normal manner of operation of a rotary-inertia anti-skid device, when the speed of the road wheels falls the clutch spring 42 tends to wind up as the flywheel 18 overruns the shaft 8, and the clutch spring slips to allow the flywheel to continue to rotate at a higher speed than the shaft, while continuing to exert a frictional drag torque on the flywheel and a corresponding drag torque on the first cam member 21.

The drag force exerted on the first cam member 21 tends to rotate the member 21 and its transverse peg 37. This tendency to rotate is opposed by the interaction of the cam surfaces 33, 34 of the first and second cam members are pressed together by axial tension from the torsion spring 36, and also by the torque set up in the torsion spring 36 as the transverse peg 37 tends to turn one end of the spring 36 relative to the other end.

As is usual in the operation of a rotary-inertia skid-sensing device, when the rate of deceleration of the shaft 8 exceeds a predetermined value, indicating an imminent wheel-locking condition, the cam members 21, 28 are moved apart axially by a certain distance, and when this occurs the end cap 35 is arranged to contact an actuating device 43 for a skid-correcting system mounted coaxially in the cover portion 4 of the housing. In the arrangement illustrated the device 43 is an electrical switch connected in an electrical circuit for operating a valve to release the associated brakes, but in an alternative arrangement the cap 35 may be arranged to actuate a fluid-pressure valve directly. The switch 43 is arranged to effect the release of the brakes associated with the driven wheels of the vehicle until the rate of deceleration of the wheels is reduced sufficiently to avoid skidding.

The end cap 35 to which the torsion spring 36 is attached is provided with a flange 44 having a pair of radially outwardly projecting ears 45, 46 for engagement with the end of the second cam member 28, the end of the second cam member having a series of notches 47 cut around its periphery to enable the ears of the end cap to be locked in position to hold the end cap against rotation relative to the cam member. This enables the torsion spring 36 to be pre-stressed to any required torque value, and thus provides means for setting up the device for operation at a predetermined deceleration rate.

The skid-sensing device described above has the advantage that the torsion spring 36 combines two functions in that it provides axial tension to hold the cam members together and also provides a torque to oppose relative rotation of the members. This enables the device to be constructed more simply and cheaply than conventional devices in which separate springs are provided for these two functions.

The arrangement by which the end cap 35 can be rotated to adjust the deceleration rate at which the device will operate is particularly advantageous since it enables this adjustment to be made without extensive dismantling of the device.

The transverse peg 37 and the frusto-conical holes in the shaft provide a convenient and inexpensive means for limiting the angular movement of the first cam member relative to the shaft. Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention to suit individual design requirements, and it is intended that such revisions and adaptations will be included within the scope of the following claims as equivalents of the invention.

Having described my invention, what I claim is:

1. In a rotary-inertia skid-sensing device having a drive shaft and clutch, the structure comprising a flywheel drivable by said shaft, said clutch which is arranged in operation of the device to permit the flywheel to overrun the shaft when the rotatable drive shaft is decelerated, and cam means arranged to be operated upon deceleration of the shaft relative to the flywheel to actuate a skid-correcting system, said cam means comprising a pair of axially-aligned relatively angularly movable cam members in the form of a first cam member mounted in relatively fixed relation on said drive shaft, and a second cam member mounted for angular movement relatively to said first cam member, said cam members having adjoining faces on which complementary cam surfaces are formed, a torsion spring operatively connected to said first cam member and to said second cam member to torsionally oppose relative angular movement of said cam members when said fly wheel overruns the drive shaft, said torsion spring being further connected to provide in addition to its torsional effect, an axially directed force urging the complementary cam surfaces of said cam members together.

2. A device according to claim 1 wherein the cam members are mounted coaxially with respect to the shaft, a first cam member being drivable by the flywheel and a second cam member being keyed to rotate with the shaft so that axial movement of the cam members is effected when the flywheel overruns the shaft, the torsion spring being a coiled spring associated at opposite ends with the respective cam members and arranged to oppose the said relative angular movement of the cam members.

3. A device according to claim 2 wherein the cams are of hollow cylindrical form and the coiled spring extends coaxially through the cam members.

4. A device according to claim 3 wherein the shaft is bored from one end to provide a hollow portion, the coiled spring extending through the hollow portion and being attached at its end associated with the first cam member to a transverse peg passing through a pair of clearance holes formed at diametrically opposite points of the wall of the hollow portion of the shaft, the peg drivably engaging the first cam member.

5. A device according to claim 4 wherein the first cam member is rotatably mounted in an axially-fixed position between the ends of the shaft and the second cam member is mounted at one end of the shaft in abutting relationship with the first cam member.

6. A device according to claim 5 wherein the second cam member is provided with a fastening member to which the coiled spring is secured, the fastening member being rotatable relative to the cam members to apply a torque to the coiled spring and being arranged so that it can be non-rotatably secured to the second cam member.

7. A device according to claim 6 wherein the end of the second cam member remote from the first cam member has a series of notches cut around its periphery and the fastening member is provided with at least one ear for engagement with a notch to secure the fastening member in position.

8. A device according to claim 7 wherein the fastening member is in the form of an end cap for the second cam member.

9. A device according to claim 8 wherein the end cap constitutes a thrust member for engagement upon axial displacement of the second cam member, with an actuating device for a skid-correcting system.

10. A device according to claim 3 wherein the flywheel is rotatably mounted coaxially with the shaft and a friction clutch in the form of a coiled clutch spring is provided to drivably connect the flywheel to the first cam member, the coiled clutch spring making frictional engagement with the flywheel and the cam member, the coiled clutch spring being wound so that it provides a positive drive coupling to enable the flywheel to be accelerated with the shaft and to slip as the flywheel tends to overrun the shaft on deceleration of the shaft, the slipping clutch spring then exerting a frictional drag torque on the first cam member.

11. A device according to claim 10 wherein the coiled clutch spring fits coaxially within the first cam member in frictional engagement with an inner surface thereof and also fits coaxially within a bore of equal diameter formed in the flywheel.

12. A device according to claim 1 wherein drive-transmitting means is provided to drive the said shaft from a drive shaft for at least one wheel of an associated vehicle, the drive-transmitting means having a predetermined amount of backlash.

13. A device according to claim 12 wherein the drive-transmitting means comprises a rotatable drive member mounted on the shaft of the skid-sensing device and capable of relative rotation with respect thereto through a predetermined angle.

References Cited

UNITED STATES PATENTS

| | | | |
|---|---|---|---|
| 2,163,731 | 6/1939 | Hallot | 188—181 |
| 2,818,244 | 12/1957 | Ropar | 188—181 X |
| 2,964,048 | 12/1960 | Mortimer | 188—181 X |
| 3,165,180 | 1/1965 | Inderau | 188—181 X |

DUANE A. REGER, *Primary Examiner.*